United States Patent [19]

Husain

[11] Patent Number: 4,913,849

[45] Date of Patent: Apr. 3, 1990

[54] PROCESS FOR PRETREATMENT OF CHROMIUM-RICH OXIDE SURFACES PRIOR TO DECONTAMINATION

[76] Inventor: Aamir Husain, 3301 Hargrove Road, Mississauga, Ontario, Canada, L5L 4E9

[21] Appl. No.: 216,218

[22] Filed: Jul. 7, 1988

[51] Int. Cl.[4] .......................... G12F 9/00; C02F 5/08; C23G 1/02; B08B 7/04

[52] U.S. Cl. ........................................ 252/626; 134/3; 134/13; 134/22.14; 134/22.16; 134/27; 134/28; 134/41; 210/682; 210/684; 376/306; 376/310

[58] Field of Search ................ 252/626, 627, 631, 80; 376/310, 306, 308, 309; 210/682, 684; 422/186.08; 134/2, 3, 10, 13, 28–30, 36, 41

[56] References Cited

U.S. PATENT DOCUMENTS

| | | | |
|---|---|---|---|
| 4,226,640 | 10/1980 | Bertholdt | 134/3 |
| 4,287,002 | 9/1981 | Torok | 134/3 |
| 4,476,047 | 10/1984 | Bonnici et al. | 256/626 |
| 4,481,040 | 11/1984 | Brookes et al. | 134/3 |
| 4,685,971 | 8/1987 | Murray et al. | 134/2 |
| 4,686,067 | 8/1987 | Veysset et al. | 252/626 |
| 4,704,235 | 11/1987 | Arvesen | 256/626 |
| 4,731,124 | 3/1988 | Bradbury et al. | 134/3 |
| 4,839,100 | 6/1989 | Goodall et al. | 252/626 |

FOREIGN PATENT DOCUMENTS

| | | | |
|---|---|---|---|
| 1062590 | 9/1979 | Canada | 149/19 |
| 1217412 | 2/1987 | Canada | 149/19 |
| 0313843 | 3/1989 | European Pat. Off. . | |
| 2358683 | 6/1975 | Fed. Rep. of Germany . | |
| WO84/03170 | 8/1984 | World Int. Prop. O. . | |

OTHER PUBLICATIONS

"Dekontamination von Hauptkuhlmittelpumpen mit dem neuen VS–Verfahren" in *Atomwirtschaft* at pp. 83–86.

*Primary Examiner*—Howard J. Locker
*Attorney, Agent, or Firm*—Ridout & Maybee

[57] ABSTRACT

A process for pretreatment of chromium-rich oxide surfaces of nuclear reactor cooling system components involves application of a dilute acidic reagent comprising potassium permanganate and chromic acid, at elevated temperatures.

7 Claims, No Drawings

PROCESS FOR PRETREATMENT OF CHROMIUM-RICH OXIDE SURFACES PRIOR TO DECONTAMINATION

This invention relates to the decontamination of stainless steel components present in the cooling system of a pressurized water reactor (PWR), particularly a CANDU (trademark) pressurized heavy water nuclear reactor (PHWR).

During the operation of a nuclear reactor, corrosion products from system surfaces exposed to hot, pressurized water or heavy water coolant are transported through the reactor core and ultimately redeposit as activated corrosion products on outreactor parts of the system. The resulting radiation field growth restricts personnel access for maintenance of system components.

The CAN-DECON (trademark) process described in Canadian Pat. No. 1,062,590 has been widely used with success in the decontamination of carbon steel surfaces in the cooling system of nuclear reactors. That process involves the addition of an acidic reducing/complexing reagent (typically, a mixture of citric and oxalic acids and ethylenediaminetetraacetic acid (EDTA)) to the circulating coolant to solubilize corrosion products. The dilute reagent is regenerated by passage through an ion exchange medium.

The cooling system of CANDU PHWRs include components made from high-chromium alloys such as Inconel 600 or SS-410 stainless steel. It is well recognized that, without an oxidizing pretreatment step to solubilize the chromium, the contaminated chromium-rich oxides formed on such components dissolve only with great difficulty in a reducing CAN-DECON reagent. A number of publications and patents have been directed to developing oxidizing reagents to solubilize Cr(III) in a pretreatment step prior to a CAN-DECON treatment or other reducing steps. Early interest centered almost exclusively on concentrated alkaline permanganate (AP) reagent for oxidative solubilization. The overall reaction may be described as:

$$Cr_2O_3+2MnO_4^-+2OH^-\rightarrow 2CrO_4^{-2}+2MnO_2+H_2O$$

Corrosion and waste management problems associated with the high concentration (10% NaOH+3% $KMnO_4$) of the reagents led to the development of dilute AP reagents. The dilute AP reagent was, however, found to be generally less effective on stainless steel surfaces than on Inconel surfaces.

As an alternative to the AP reagent, a dilute nitric acid/permanganate reagent (NP) was proposed in U.S. Pat. No. 4,481,040, by means of which chromium is oxidized according to the net reaction:

$$Cr_2O_3+2MnO_4^-+2HCrO_4^-+2MnO_2$$

This reagent was observed to be more effective on stainless steel surfaces than the dilute AP reagent. In a CANDU PHWR the NP pretreatment would, however, downgrade the heavy water ($D_2O$) by introducing extraneous hydrogen ions.

The use of ozone to oxidize chromium in a two-step decontamination process has been described in U.S. Pat. No. 4,287,002. However, the thermal instability of ozone militates against its direct use within the cooling system of a CANDU-type reactor. Without removal of the fuel bundles in such a reactor, the shutdown temperature is typically above 60° C., temperatures at which ozone rapidly decomposes. Lower temperatures cannot be achieved without actually defueling the system, a major undertaking involving considerable reactor downtime. Ozone-based systems using $Ce^{+4}$ or $Cr^{+6}$ ions as synergistic co-oxidants or stabilizing agents have also been proposed: U.S. Pat. Nos. 4,685,971, 4,704,235 and published PCT Application No. PCT/SE84/00012.

In the course of a program for evaluating two-step processes for decontaminating SS-410 CANDU end fittings, it has now been discovered that a variation (CP) of the aforementioned NP reagent, in which chromic acid (from dosed $CrO_3$) is used in place of nitric acid in conjunction with the permanganate, is unexpectedly effective as a chromium-solubilizing pretreatment agent in a two-step CP/CAN-DECON decontamination process. The dilute CP reagent is optimally effective at temperatures of 95° C. or higher, so that defueling of the reactor is not required. Use of $CrO_3$ in the CP reagent avoids the introduction of extraneous ions into the pretreatment solution, since chromate ions are released from the contaminated metal oxide surfaces of the cooling system by any oxidative pretreatment. Also, the inevitable downgrading of heavy water due to the introduction of nitric acid in the NP reagent is avoided with the use of $CrO_3$ in the CP reagent.

With a view to affording a new and efficient method of decontaminating nuclear reactor systems to reduce radiation fields, there is provided, according to one embodiment of the invention, a method of decontaminating stainless steel components of the cooling system of a nuclear reactor, which comprises pretreating the contaminated components with an aqueous acidic oxidizing solution containing potassium permanganate and chromic acid, without ozone, at a temperature of about 50° C. or greater to solubilize chromium in surface oxide layers of said components, preparatory to treatment with an aqueous decontamination solution to dissolve and remove residual metallic oxides from the surface of the components. The aqueous oxidizing solution preferably contains potassium permanganate at a concentration between about 0.1% and about 0.2% by weight and chromic acid as $CrO_3$ at a concentration between about 0.005 and about 0.02% by weight.

According to another embodiment of the invention, there is provided a method of decontaminating stainless steel components of the cooling system of a nuclear reactor, comprising the steps of contacting the components successively with: (a) a reducing agent in acidic aqueous solution; (b) an aqueous acidic oxidizing solution containing potassium permanganate and chromic acid as chromium (VI) oxide, without any added ozone; and (c) an acidic aqueous solution of reducing agent as aforesaid, said steps of contacting the components with reagents (a), (b), and (c) being carried out at a temperature of about 50° C. or greater. Preferably, the aqueous acidic oxidizing solution contains a concentration of potassium permanganate between about 0.1% and about 0.2% by weight, and a concentration of chromic acid as $CrO_3$ of between about 0.005% and about 0.02% by weight.

Other features which are considered as characteristic for the invention are set forth in the appended claims. Although the invention is described and exemplified herein as embodied in a method for the chemical decontamination of nuclear reactor components, it is nevertheless not intended to be limited to the details shown, since various modifications may be made thereto within the scope and range of equivalents of the claims.

The studies resulting in the discovery of the effectiveness of a chromic permanganate (CP) reagent, were designed to evaluate a wide variety of two-step processes for decontaminating stainless steel (SS410) CANDU end fittings. In the first step of such a process, a dilute oxidizing (O) solution is applied to solubilize chromium present in the oxide surfaces. This is followed by a reducing (R) step (e.g. dilute CAN-DECON) to dissolve the resulting chromium-deficient oxide. Without an oxidizing pretreatment, chromium-rich oxides do not readily dissolve in a reducing reagent.

One of the oxidizing reagents investigated was a combination of $CrO_3+KMnO_4+NaBiO_3$. It was believed that this combination would be analogous in function to the system of $CrO_3+KMnO_4+O_3$ described by Arvesen et al. in PCT/SE84/00012. That application had claimed good results in the decontamination of samples of AISI 304, Incoloy 800, and Inconel 600 using the ozone-based pretreatment combination. $NaBiO_3$ was substituted for $O_3$ since both have identical redox potentials. Moreover, the substitution was contrived to preserve the two-phase nature of the reagent, with the distinction that $NaBiO_3$ is a sparingly soluble solid while $O_3$ is a slightly soluble gas. Surprisingly, however, it was found that the $NaBiO_3$ appeared to play no role in the release of chromium during the oxidative pretreatment of specimens. Solutions of permanganate and chromic acid, without any added $NaBiO_3$ were found to be considerably more effective than nitric permanganate (NP) or alkaline permanganate (AP) treatments. Corrosion rates in a CP/CAN-DECON process compared very favorably with those in NP/CAN-DECON need for removing the overlying magnetite layer prior to oxidative treatment.

CAN-DECON trials were carried out using a stainless steel recirculating water loop wherein sample coupons mounted on a holder inside a sample chamber were exposed to the circulating reagent. The test loop is equipped with ion exchange columns in a purification circuit. The reducing CAN-DECON treatment was always applied in the loop at 85° C., with the pH controlled so as not to exceed 3.5. The initial CAN-DECON reagent composition was 400 ppm EDTA+200 ppm citric acid+50 ppm oxalic acid+0.1% Rodine 31A.

The progress of each CAN-DECON treatment was followed by monitoring on-line the removal of Co-60 activity on the coupons with a gamma detector. The activity of each sample was counted using a contamination meter. The average counts were used to determine the sample decontamination factor (DF), conventionally defined as the ratio of activity before to the activity after decontamination.

The oxidizing treatments were variously performed in Pyrex glass kettles, jacketed-glass beakers, autoclaves, or in the stainless steel decontamination test loop itself.

The results for two-step decontaminations of inlet liner samples using the CP reagent are shown in Table 1. The results of runs 1 to 3 suggested an increase in reagent effectiveness at higher temperatures. Subsequent exposures to the CP reagent were, therefore, conducted at 100° C., the upper temperature limit in the kettle. A high DF (greater than 10) was noted in most cases, representing essentially the complete removal of the oxide on "OR" exposed samples. Low residual activity is believed to have arisen from base metal activation.

TABLE 1

DECONTAMINATION OF CAN-DECON EXPOSED J15 INLET LINER SAMPLES-CHROMIC PERMANGANATE PRETREATMENT

| | Oxidizing Step | | | | | R Step | | OR Cycle | |
|---|---|---|---|---|---|---|---|---|---|
| | Reagent Conc. (Wt %) | | | pH | | | | Oxide Removed | |
| Run # | $CrO_3$ | $KMnO_4$ | Temp. (°C.) | Initial | Final | KF | DF | (μm) | DF |
| 1 | 0.02 | 0.2 | 100+ | 2.8 | 2.5 | 1.0 ± 0.1 | 10 ± 1 | 1.8 ± 0.5 | 11 ± 2 |
| 2 | 0.02 | 0.2 | 75+ | 2.7 | 2.4 | 1.1 ± 0.2 | 6 ± 5 | 2.3 ± 0.4 | 7 ± 6 |
| 3 | 0.02 | 0.2 | 50+ | 2.7 | 2.5 | 1.1 ± 0.1 | 5 ± 2 | 2.2 ± 0.2 | 5 ± 2 |
| 4 | 0.01 | 0.2 | 100 | 3.0 | 2.9 | 1.0 ± 0.0 | 17 ± 6 | 2.6 ± 0.2 | 19 ± 6 |
| 5 | 0.02 | 0.2 | 100 | 2.7 | 2.6 | 1.0 ± 0.1 | 16 ± 1 | 2.3 ± 0.0 | 17 ± 1 |
| 6 | 0.005 | 0.2 | 100 | 3.4 | 3.8 | 1.4 ± 0.2 | 19 ± 7 | 2.3 ± 0.1 | 26 ± 7 |
| 7 | 0.02 | 0.2 | 100 | 2.7 | 2.6 | *6.0, 1.1 | 10 ± 1 | 1.9 ± 0.4 | *64, 11 |
| 8 | 0.01 | 0.1 | 100 | 3.0 | 2.7 | *3.6, 1.1 | *4.2, 12 | 2.2 ± 0.2 | 14 ± 1 |
| 9 | 0.02 | 0.1 | 100 | 2.7 | 2.7 | 1.4 ± 0.2 | 18 ± 2 | 2.7 ± 0.1 | 24 ± 1 |
| 10 | 0.02 | 0 | 100 | 2.5 | 2.3 | 0.9 ± 0.1 | 1.6 ± 0.1 | 0.5 ± 0.0 | 1.4 ± 0.1 |

+Samples were immersed in the solution before raising the temperature; the heat-up period was ~1 h.
*Because of widely differing DFs for the two samples, the results were not averaged.
Note: All samples except those exposed in Run 10 were essentially completely cleaned. Their residual activity was <500 cpm compared to a background of ~100 cpm.

or AP/CAN-DECON two-step decontamination processes. In particular, the carbon steel corrosion rates were significantly lower.

Decontamination measurements were carried out on samples taken from the inlet and outlet liners of end fittings from an operating CANDU reactor. Unless otherwise stated, the samples were exposed to the CAN-DECON treatment prior to their first oxidizing exposure. Decontamination factors were found to be relatively low unless there was previous CAN-DECON exposure of the samples. This result is attributed to the The experimental results summarized in Table 2 below involve the exposure of inlet and outlet liner samples to CF reagent in the stainless steel decontamination test loop, to simulate more realistically the in-reactor behavior of the CP reagent. Decontamination of CAN-DECON exposed specimens (both R and ROR-treated samples) designated as J15 (inlet liner) G16 (outlet liner from same reactor as J15) and M16 (outlet liner from separate reactor unit) were evaluated in two loop runs, each consisting of a CP step (O) and a CAN-DECON step (R).

TABLE 2

DECONTAMINATION OF CAN-DECON EXPOSED LINER SAMPLES - CHROMIC PARMANGANATE PRETREATMENT TO LOOP

| Sample Exposed To | Previously Removed (μm) | OR Cycle Oxide DF | OR Cycle Removed (μm) | OROR Cycle Oxide DF | OROR Cycle |
|---|---|---|---|---|---|
| J15 | R Step | 2.8 ± 0.8 | 2.5 ± 0.7 | 4.8 ± 0.6 | 14 ± 4* |
| J15 | ROR Cycle | 1.4 ± 0.4 | 3.6 ± 1.1* | — | — |
| G16 | R Step | 3.4 ± 1.0 | 2.3 ± 0.3 | 6.4 ± 0.6 | 9 ± 4* |
| G16 | ROR Cycle | 2.0 ± 0.1 | 3.8 ± 1.3** | — | — |
| M16 | ROR Cycle | 2.0 ± 0.1 | 4.0 ± 0.5+ | — | — |

*No residual oxide on liner surfaces.
**Residual oxide on outer liner surfaces.
+Residual oxide on inner liner surface of one sample.

In the first oxidizing run, the reagent composition was initially 0.2% $KMnO_4$ plus 0.005% $CrO_3$. The pH was maintained at about 3 by subsequent addition of further $CrO_3$, bringing the total to about 0.01% $CrO_3$. In the second oxidizing run, the reagent composition of 0.2% $KMnO_4$ plus 0.005% $CrO_3$ was maintained throughout the run, with the pH being effectively controlled by operating a strong acid cation exchange column in the purification circuit. It was noted that even at relatively low flow rates, the second oxidizing run enabled the effective decontamination of the J15 and J16 samples (OROR results in Table 2), suggesting efficacy of the CP reagent in solubilizing chromium under the restricted flow conditions of a CANDU reactor face decontamination.

Table 3 below presents a comparison of experimental results on the decontamination effectiveness for stainless steel liners using AP, NP and CP pretreatments. With the exception of the G16 results in NP, the comparison between the three processes is based on their application under usual or typical conditions. The data points to reagent effectiveness, in general, in the order $AP < NP < CP$. The exception would appear to be in the case of loop-exposed J15 liners in which case CP and AP were found to be of comparable effectiveness.

TABLE 3

A COMPARISON OF DECONTAMINATION EFFECTIVENESS USING AP, NP, and CP PRETREATMENTS

| Process | Cr Released in 1st O Step+ (μg/cm²) J15 | Cr Released in 1st O Step+ (μg/cm²) G16 | OR Cycle J15 K/B | OR Cycle J15 L | OR Cycle G16 K/B | OR Cycle G16 L | OROR Cycle J15 K/B | OROR Cycle J15 L | OROR Cycle G16 K/B | OROR Cycle G16 L |
|---|---|---|---|---|---|---|---|---|---|---|
| AP | 150 | $<$40 | — | 3 | 1.2 | 1.7 | — | a | — | 2.5 |
| NP | 250° | — | 3 | — | 2.2* | — | — | — | >9* | — |
| CP | — | 350 | a | 3 | 3.0 | 2.5 | b | a | a | a |

(Columns under "Decontamination Factor".)

+Beaker exposure.
The two data columns under each liner type correspond to O step exposures in a kettle or beaker (K/B) and loop (L), respectively.
*pH 2.5, 0.5% $KMnO_4$, 150° C.
°Average of results for CAN-DECON exposed samples.
[a]Activity reduced to background level (no residual oxide on specimens).
[b]Exposure to OROR cycle not necessary.

The chromic permanganate reagent has been found effective in pretreating both inlet and outlet liner surfaces prior to exposure to an aqueous reductive decontamination solution such as oxalic acid/citric acid mixtures. However, a reducing treatment must generally precede the oxidizing exposure to remove the magnetite overlayer and hence permit greater reagent penetration into the underlying chromium rich oxide. A five-step process ROROR, including the initial CAN-DECON exposure, is adequate to decontaminate the liner surfaces to background levels.

The general corrosivity of a two-step CP/CAN-DECON decontamination process was evaluated for four principal CANDU primary heat transport system materials—carbon steel, SS410, Monel 400 and Inconel 600. Weight loss for samples exposed to the two steps was compared with that from CAN-DECON exposure only, yielding by difference the weight loss in the oxidation step. Direct measurement of the oxidation step weight loss was not possible, owing to $MnO_2$ deposition in the oxidation step; the deposit is solubilized in the subsequent CAN-DECON step yielding an overall weight loss for the two steps. The experimentally measured corrosion losses in CP/CAN-DECON are compared in Table 4 with those reported elsewhere for AP/CAN-DECON and NP/CAN-DECON exposures.

The results obtained indicate that corrosion losses in CP/CAN-DECON, particularly for carbon steel, compare very favorably with those in AP/CAN-DECON and NP/CAN-DE-CON.

Chromic permanganate reagent exhibits a number of properties which make it of value in a two-step decontamination process, including its simplicity, temperature stability, high degree of effectiveness and corrosivity.

TABLE 4

A COMPARISON OF CORROSION LOSSES IN AP/CAN-DECON, NP/CAN-DECON AND CP/CAN-DECON TREATMENTS

| Material | Corrosion Loss (μm) AP*/CAN-DECON+ | Corrosion Loss (μm) NP/CAN-DECON+ | Corrosion Loss (μm) CP°/CAN-DECON+ |
|---|---|---|---|
| CS | 69 ± 32 | 69 ± 13 | 5.7 ± 1.0 |
| SS 410 | 0.59 ± 0.10 | 0.62 ± 0.11 | 0.16 ± 0.04 |
| Monel 400 | 1.86 ± 0.72 | 2.90 ± 0.09 | 0.17 ± 0.01 |

TABLE 4-continued

A COMPARISON OF CORROSION LOSSES IN AP/CAN-DECON, NP/CAN-DECON AND CP/CAN-DECON TREATMENTS

| | Corrosion Loss (μm) | | |
|---|---|---|---|
| Material | AP*/CAN-DECON+ | NP/CAN-DECON+ | CP°/CAN-DECON+ |
| Inconel 600 | 0.032 ± 0.014 | 3.40 ± 0.69 | 0.12 ± 0.03 |

*0.1% $KMnO_4$, pH 11.6, 95° C., 12 h.
0.1% $KMnO_4$, pH 2.7, 95° C., 12 h.
°0.2% $KMnO_4$ + 0.005% $CrO_3$, (initial pH 3.3) at 95° C., 24 h.
+pH 2.4–4.1, 85° C., 24 h.

The use of chromic acid affords the advantage of introducing no extraneous ions into the solution since chromate ions are released in any event from the chromium in oxide surface layers. As noted earlier, the CP reagent of the invention avoids the downgrading of $D_2O$ which is inherent in use of the NP reagent.

I claim:

1. A method of decontaminating stainless steel components of the cooling system of a nuclear reactor, comprising pretreating contaminated components with an aqueous acidic oxidizing solution consisting essentially of potassium permanganate and chromic acid as chromium (VI) oxide, at a temperature of about 50° C. or greater to solubilize chromium in surface oxide layers on said components.

2. A method according to claim 1, wherein the pretreatment of the contaminated components is carried out at a temperature of 95° C. or greater.

3. A method according to claim 1 or claim 2, wherein said aqueous oxidizing solution contains potassium permanganate at a concentration between about 0.1% and about 0.2% by weight and chromic acid as $CrO_3$ at a concentration between about 0.005% and about 0.02% by weight.

4. A method of decontaminating stainless steel components of the cooling system of a nuclear reactor, comprising the steps of contacting the components successively with:

(a) a reducing agent in acidic aqueous solution;

(b) an aqueous acidic oxidizing solution consisting essentially of potassium permanganate and chromic acid as chromium (VI) oxide, at a temperature of about 50° C. or greater; and (c) a reducing agent in acidic aqueous solution.

5. A method according to claim 4, wherein step (b) is carried out at a temperature of 95° C. or greater.

6. A method according to claim 4, wherein the concentration of potassium permanganate in said aqueous acidic oxidizing solution is between about 0.1% and about 0.2% by weight and the chromic acid concentration corresponds to a concentration of added $CrO_3$ of between about 0.005% and about 0.02% by weight.

7. A method according to claim 4, claim 5 or claim 6, wherein said reducing agent comprises a mixture of oxalic acid, citric acid, ethylenediaminetetraacetic acid and a corrosion inhibitor.

* * * * *